United States Patent [19]

LoMaglio

[11] 4,101,057
[45] Jul. 18, 1978

[54] TRIGGER ACTUATED PUMP

[75] Inventor: Lewis C. LoMaglio, Baton Rouge, La.

[73] Assignee: Ethyl Corporation, Richmond, Va.

[21] Appl. No.: 747,041

[22] Filed: Dec. 2, 1976

[51] Int. Cl.² ............................................. B65D 37/00
[52] U.S. Cl. ..................................... 222/207; 417/479
[58] Field of Search ............................... 222/206–214, 222/383, 101, 103, 385; 417/479, 478, 480

[56] References Cited

U.S. PATENT DOCUMENTS

| 1,741,991 | 12/1929 | King | 222/103 |
| 2,772,817 | 12/1956 | Jauch | 222/207 |
| 3,726,442 | 4/1973 | Davidson et al. | 222/207 |
| 3,749,290 | 7/1973 | Micallef | 222/207 |
| 3,986,644 | 10/1976 | Grogan et al. | 222/207 |
| 3,995,774 | 12/1976 | Cooprider et al. | 222/207 |

Primary Examiner—Robert B. Reeves
Assistant Examiner—H. Grant Skoggs
Attorney, Agent, or Firm—Donald L. Johnson; John F. Sieberth; David L. Ray

[57] ABSTRACT

A manually actuated trigger pump is adapted to be fitted on the neck of a container for dispensing a liquid therefrom. The pump includes a main housing with a trigger connected thereto, a flexible bladder which fits in the housing and is engagable by the trigger, and a nozzle which is attached to the housing. The trigger engages the bladder to pump fluid from the bladder outwardly through the nozzle.

14 Claims, 5 Drawing Figures

TRIGGER ACTUATED PUMP

BACKGROUND OF THE INVENTION

Manually operated trigger actuated dispenser pumps for liquid containers have been proposed in the past. One having wide commercial application is disclosed in U.S. Pat. No. 3,749,290 granted July 31, 1973. Such a pump employs a flexible tubular member having a ball check valve therein which is depressed or collapsed by depressing the trigger to spray liquids from the nozzle.

SUMMARY OF THE INVENTION

The pump of the present invention is a manually operated trigger actuated dispenser pump including a main housing with a trigger connected thereto, a tubular bladder which fits into the housing, and a nozzle connected to the housing. Fluids are dispensed from the nozzle by depressing the trigger which strikes the bladder and forces fluids therefrom outwardly through the nozzle.

DESCRIPTION OF THE PREFERRED EMBODIMENTS

Figure 2:
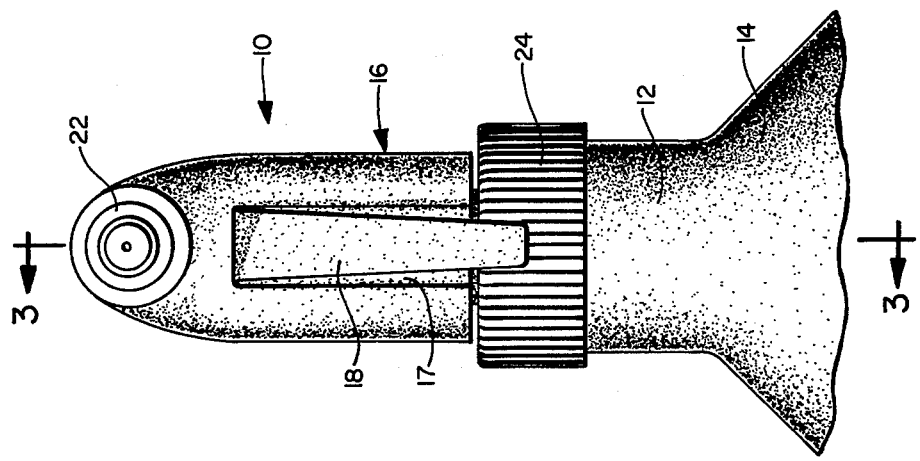
FIG. 2 is a front elevational view of the pump mounted on a container.
Figure 1:
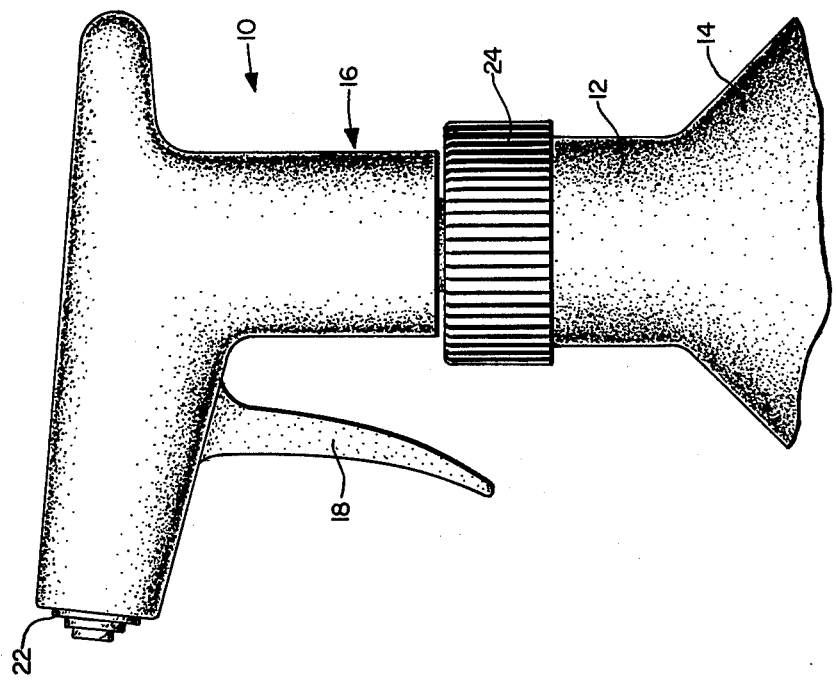
FIG. 1 is a side elevational view of the pump mounted on a container.

Referring now to the drawings, in FIGS. 1 and 2 pump 10 can be seen to be mounted on container 14. The pump 10 is held onto the container neck 12 by screw cap 24. If desired, screw cap 24 could be replaced with any conventional closure, such as a snapon closure.

Figure 3:
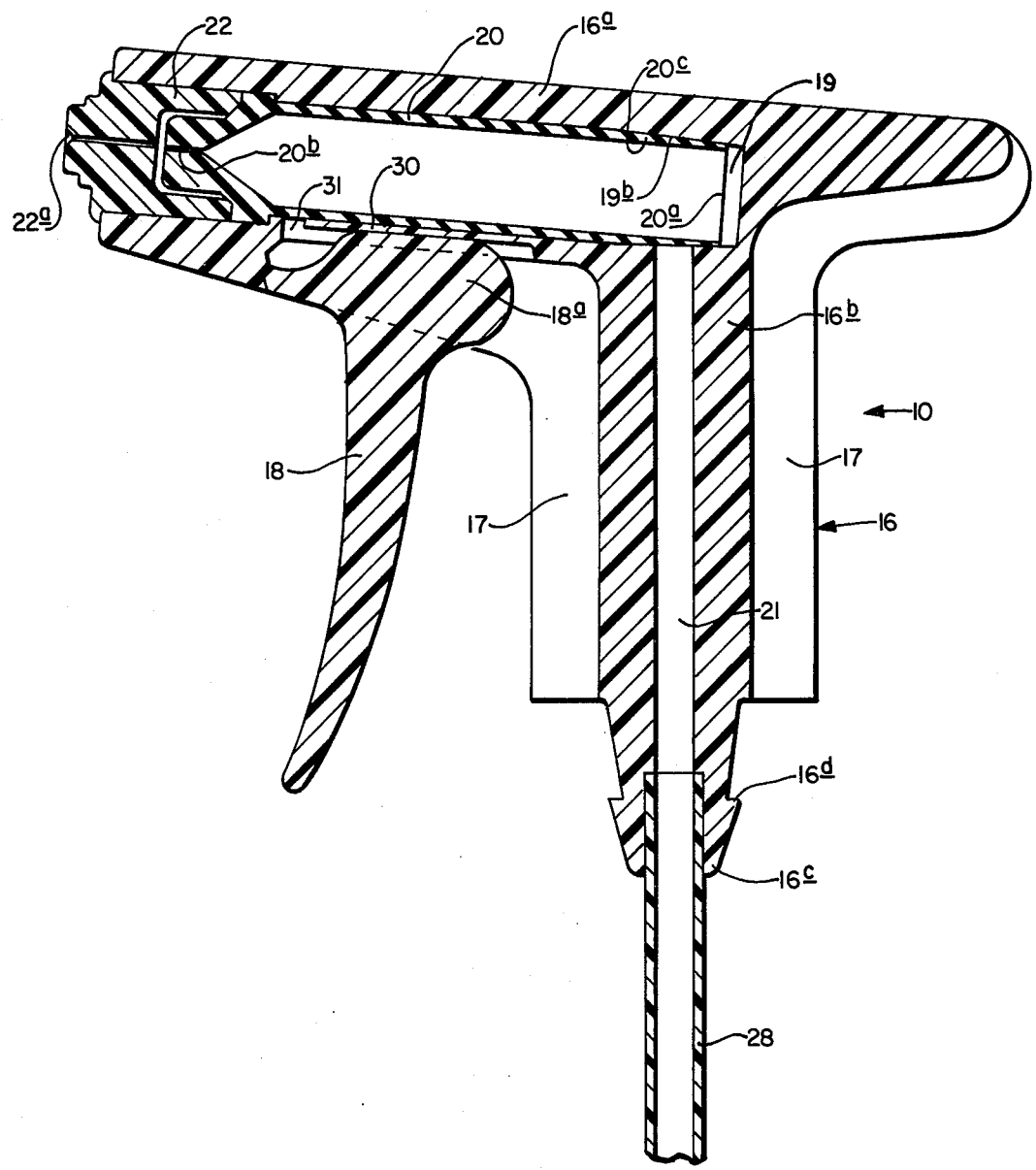
FIG. 3 is a cross-sectional view taken along lines 3—3 of FIG. 2.

As can best be seen in FIG. 3, the pump 10 includes a housing, generally indicated by the numeral 16, having, preferably, an integrally molded trigger 18. However, trigger 18 can be connected to the pump assembly or housing 16 by any conventional means, such as pinning, bolting, or the like. Housing 16 has a generally horizontal portion 16a and a generally vertical portion 16b. Horizontal portion 16a forms an approximate right angle with vertical portion 16b. Thus, when container 14 is in the upright or vertical position, horizontal portion 16a is approximately horizontal and vertical portion 16b is vertical.

Horizontal portion 16a has a generally horizontal cavity 19 therein for receipt of bladder 20 and nozzle 22. Cavity 19 has a tapered upstream end 19b for receipt of the tapered end 20a of bladder 20. A vertical channel 21 in vertical portion 16b connects suction tube 28 with cavity 19. The end 20a of bladder 20 covers the upper end of channel 21.

Suction tube 28 is connected to the lower end 16c of vertical portion 16b. The lower end 16c of vertical portion 16b can be tapered so that it may be easily inserted in the top of cap 24 and may be provided with a shoulder 16d for force fitting into a hole (not shown) in cap 24. The lower end 16c of vertical portion 16b could also be threaded to screw into a conventional closure, or formed in any other conventional manner.

Figure 3A:
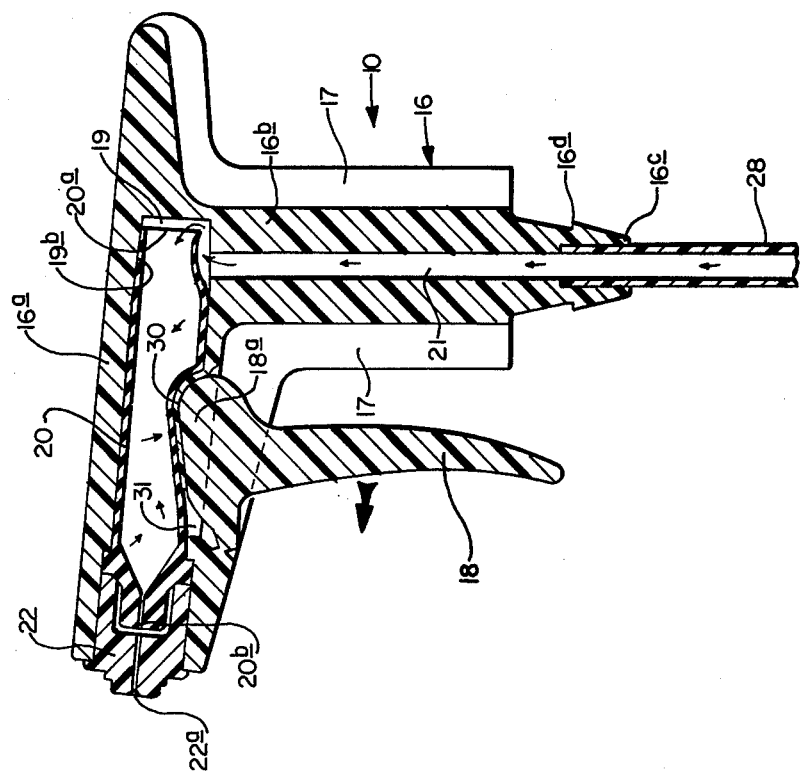
FIG. 3A is a cross-sectional view taken along lines 3—3 of FIG. 2 in which the trigger is being depressed.
Figure 3B:
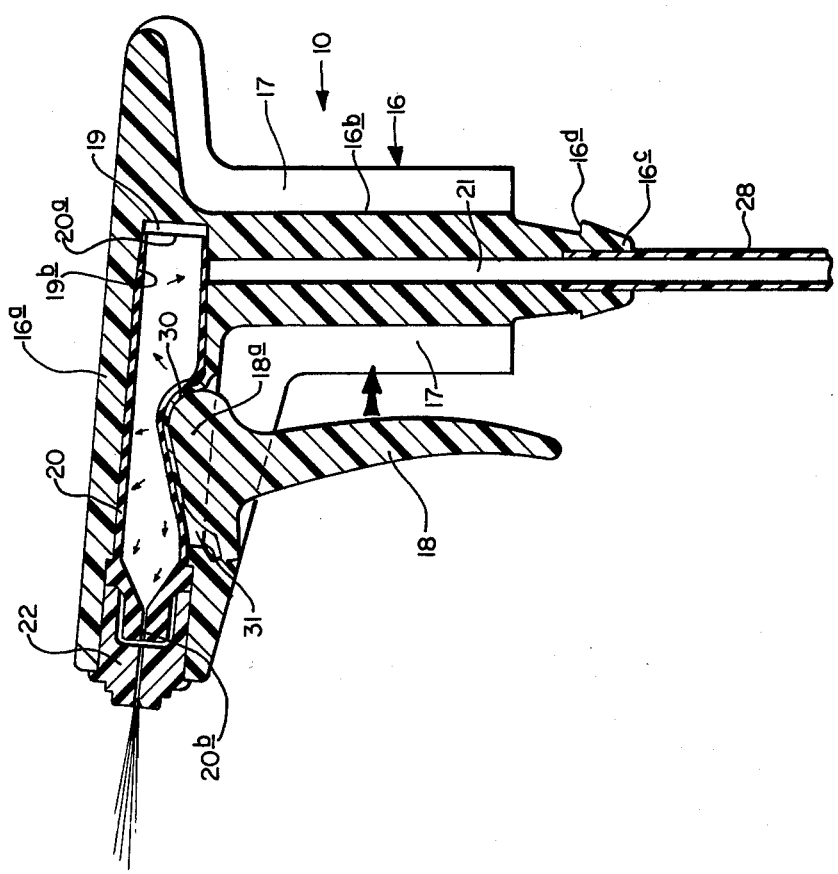
FIG. 3B is a cross-sectional view taken along lines 3—3 of FIG. 2 in which the trigger is being released.

Bladder 20 is made of an elastic material such as rubber, plastic, or other flexible materials, which can be depressed and relaxed and expand to its natural profile. The bladder incorporates a molded integral nipple-type valve 20b on its left end or downstream end which is a one-way valve that allows fluid to pass outwardly only from the bladder. The upstream end or right end 20a of bladder 20 is tubular in shape and open on the end. Preferably, bladder 20 has a relatively thin wall thickness as can be seen in FIG. 3 at 20c so that the end 20a of bladder 20 can act as a flapper valve as shown in FIG. 3B. The section 20c may be tapered to aid in assembly.

Located downstream from bladder 20 is nozzle 22. Nozzle 22 can be any conventional type nozzle which has an orifice 22a therein.

The main housing 16 has a thin leaf-like strip 30, as shown in FIG. 3, molded into the open area 31 into which the upper portion 18a of trigger 18 rests in the normal, undepressed position. The leaf-like strip 30 acts as a skid plate for upper portion 18 and easily deforms upward when trigger 18 is depressed as indicated in FIGS. 3A and 3B. However, if desired, the thin leaf-like strip 30 can be omitted to permit the upper portion 18a of trigger 18 to contact bladder 20 directly.

In FIGS. 2 thru 3B, housing 16 can be seen to have a recess 17 therein. Recess 17 is a hollow portion in housing 16 which is provided for the purpose of saving material and decreasing cost of the housing. The front portion of recess 17 can best be seen in FIG. 2 to lie directly behind the trigger. A similar recess 17 is provided on the back part of housing 16.

The operation of the pump of the present invention is depicted in drawings 3A and 3B. When trigger 18 is depressed in the direction of the arrow indicated in FIG. 3A, the upper portion 18a thereof forces the lower end of bladder 20 upward, thereby compressing the fluid contained within bladder 20. The fluid is compressed and moves outwardly through valve 20b and orifice 22a of nozzle 22 as indicated in FIG. 3A.

When trigger 18 is released, the pressure inside bladder 20 decreases and valve 20b closes. Due to the lower pressure within bladder 20 fluids are drawn upwardly through suction tube 28 and channel 21 around the end 20a of bladder 20, thus filling the bladder with fluids.

It can thus be seen that the complete pump assembly includes a relatively small number of component parts, i.e., a main housing with an integrally formed trigger, a nozzle, a bladder, a screw cap, a gasket and a dip tube. The main housing snap fits into the screw cap and incorporates a leak-proof seal. The screw cap preferably has integrally molded score marks (not shown) on the underside which allow air to enter the container between the gasket and cap to displace fluid discharged by the pump.

The pump of the present invention can thus be seen to be easily assembled. To assemble the pump, one merely inserts the bladder 20 into cavity 19 and then inserts nozzle 22 into cavity 19 downstream from the bladder 20. Dipper tube 28 may then be forced upwardly into channel 21.

The entire pump may be made entirely of plastic material as is well known in the art. The bladder, of course, should be made of a flexible material which will return to its natural profile after being deformed and depressed.

Although the preferred embodiments of the present invention have been disclosed and described in detail above, it should be understood that the invention is in no sense limited thereby and its scope is to be determined by that of the following claims.

What is claimed:

1. A manually operable liquid dispensing pump for use and incorporation on a container for a liquid to be dispensed comprising, in combination:
   a. tubular bladder means having flexible walls which expand to their natural profile when depressed and relaxed, said bladder means having an upstream end and a downstream end, said downstream end having an integrally molded one-way valve means that permits fluid to flow outwardly from said bladder means, said upstream end of said bladder means being open to permit fluid to flow into said bladder means,
   b. a one-piece, integrally molded housing means having:
      i. cavity means for receiving and containing said bladder means,
      ii. channel means communicating with said cavity means, said channel means being located substantially adjacent to said upstream end of said bladder means and between said upstream end and said downstream end of said bladder means when said bladder means is received in said cavity means, said upstream end of said bladder means sealing one end of said channel means to prevent fluids from entering said cavity means from said channel means when said bladder means is in a depressed position or in its natural profile, and permitting fluids to enter said bladder means while said bladder means is expanding to its natural profile, and
   c. trigger means connected to said housing means for depressing said bladder means to pump fluids therefrom.

2. The pump of claim 1 wherein nozzle means is located in said cavity means downstream from said bladder means.

3. The pump of claim 1 wherein said housing means has a lower tapered end means which is connectable to closure means.

4. The pump of claim 1 wherein said valve means is a nipple-type valve.

5. The pump of claim 4 wherein said upstream end of said bladder means has walls which are thinner in thickness toward said upstream end, and said upstream end acts as a one-way valve to permit fluids to enter said upstream end of said bladder means.

6. The pump of claim 1 wherein said housing means has a thin leaf-like strip molded therein adjacent to said cavity means to provide a skid plate for said trigger means when said trigger means is depressed.

7. The pump of claim 1 wherein said trigger means is integrally molded with said housing means.

8. A manually operable liquid dispensing pump for use and incorporation on a container for a liquid to be dispensed comprising, in combination:
   a. tubular bladder means having flexible walls which expand to their natural profile when depressed and relaxed, said bladder means having an upstream end and a downstream end, said downstream end having an integrally molded oneway valve means that permits fluid to pass outwardly from said bladder means, said upstream end of said bladder means being open to permit fluids to flow into said bladder-means,
   b. a one-piece, integrally molded housing means having:
      i. cavity means for receiving and containing said bladder means, said cavity means being disposed in a generally horizontal plane when said container is in an upright position,
      ii. channel means communicating with said cavity means, said channel means being substantially axially aligned with said container, said channel means being located substantially adjacent to said upstream end of said bladder means and between said upstream end and said downstream end of said bladder means when said bladder means is received in said cavity means, said upstream end of said bladder means sealing one end of said channel means to prevent fluids from entering said cavity means from said channel means when said bladder means is in a depressed position or in its natural profile, and to permit fluids to enter said bladder means while said bladder means is expanding to its natural profile, and
   c. trigger means connected to said housing means for depressing said bladder means to pump fluids therefrom.

9. The pump of claim 8 wherein said housing means has a lower tapered end means which is connectable to closure means.

10. The pump of claim 8 wherein said valve means is a nipple-type valve.

11. The pump of claim 8 wherein said upstream end of said bladder means has walls which are thinner in thickness toward said upstream end.

12. The pump of claim 8 wherein said housing means has a thin leaf-like strip molded therein adjacent to said cavity means to provide a skid plate for said trigger means when said trigger means is depressed.

13. The pump of claim 8 wherein said trigger means is integrally molded with said housing means.

14. The pump of claim 8 wherein nozzle means is located in said cavity means downstream from said one-way valve means.

* * * * *